Figure 5:
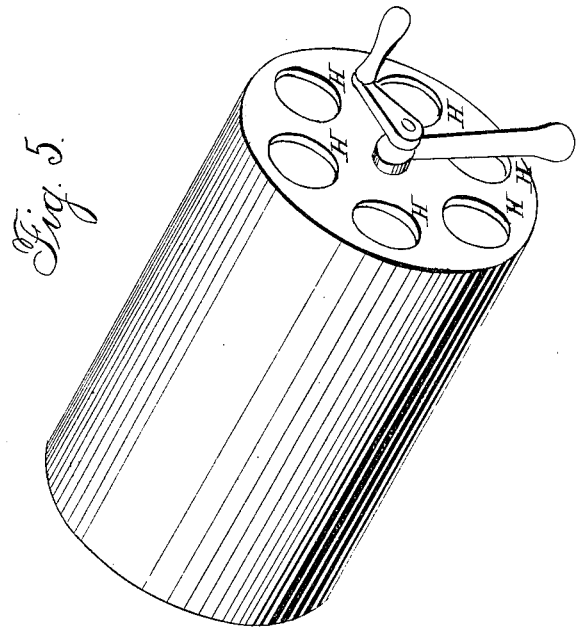

2 Sheets—Sheet 1.
T. DAVISON.
Preserving Meat.
No. 6,623. Patented Aug. 7, 1849.
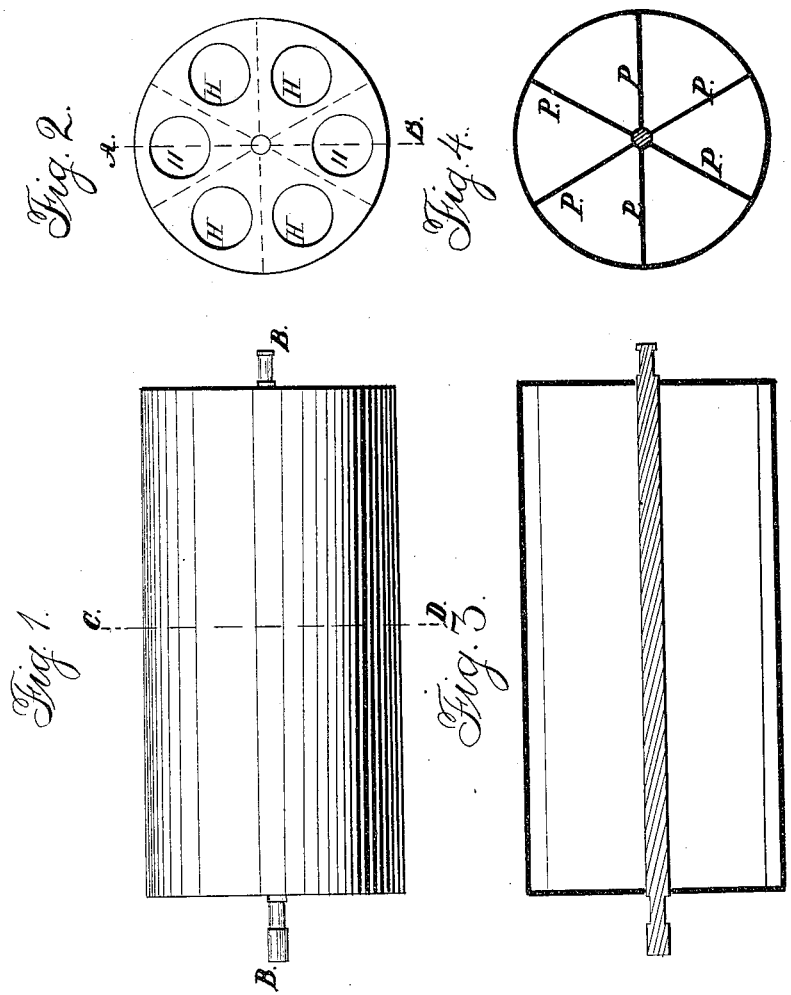

2 Sheets—Sheet 2.

T. DAVISON.
Preserving Meat.

No. 6,623.

Patented Aug. 7, 1849.

UNITED STATES PATENT OFFICE.

THOMAS DAVISON, OF NEW YORK, N. Y.

SALTING MEATS.

Specification of Letters Patent No. 6,623, dated August 7, 1849.

*To all whom it may concern:*

Be it known that I, THOMAS DAVISON, of New York city, in the county of New York and State of New York, have invented a new and useful Improvemnt in Curing and Salting the Flesh of Animals, and that the following is a full, clear, and exact description of the principle or character which distinguishes it from all other things before known and of the usual maner of making, modifying, and using the same, reference being had to the accompanying drawings, making a part of this description, in which—

Figure 1 is an exterior side view of the machine. Fig. 2 an end view. Fig. 3 is a longitudinal section on line A R Fig. 2. Fig. 4 is a cross section on line C D Fig. 1. Fig. 5 is a perspective view of the machine ready for use.

The nature of my invention consists in communicating motion to meat while undergoing the process of salting, or curing, causing the brine (or other substance with which it is desired to impregnate it) to circulate around all the pieces of meat in order to supply the surface as rapidly as it is absorbed by the interior portions; and also by keeping the particles of the meat in motion, effecting a rapid transfer of the salt from the particles on the outside to those adjoining and so on till the whole piece is salted.

The present mode of salting meat viz: rubbing the surface over with salt, then allowing it to remain either covered with salt or immersed in brine till saturated, is found to be tedious, as the passing of the salt into the meat, depends upon the chemical and capillary attraction aided by the pressure due to the difference in weight of the heavy brine outside and the lighter fluids within the meat. In hot climates it is found that meat cannot be saved by this process of salting except in very small pieces, as the salt has not time to pass into the center of a large piece before decomposition takes place. Other methods have been tried, that of forming a vacuum around the meat in order to disengage the air or other gases it contained and therby make room for the salt and brine to enter, but it has been found that the gases contained in the pores expand and exert an outward pressure that rather hinders than facilitates the entering of the brine, and on admitting the atmosphere the meat returns to its original state. Hydraulic pressure has also been tried but with no better result, for the greater the pressure applied to a flexible substance like meant the more the pores become collapsed and consequently prevent the brine passing in.

What is attained by my process is, first, the keeping a continued supply of strong brine and salt to the outside of the pieces, secondly causing that brine to be rapidly distributed throughout the whole mass, by keeping the particles of the meat in motion, the outside portions transferring it to those next adjoining, those to the next and so on till the whole mass is impregnated which is effected in a much shorter time than by any other process.

To enable others to make use of my invention I will proceed to describe the process.

The apparatus I recommend is a cylinder (represented in the drawing Fig. 1) suspended horizontally upon axles at the ends B, B. The inside is furnished with six more or less partitions P extending from the periphery to the axles the whole length of the cylinder and securely fastened. The meat to be operated upon together with the salt brine &c. is placed in the cylinder (equal portions in each of the six compartments) through holes H either in the end or side as may be most convenient. The holes are then closed and the cylinder with its contents caused to revolve on its axles by any convenient power and the motion continued as long a time as may be required.

Having thus fully described my invention I wish it to be distinctly understood that I do not claim any particular form of appartus as that can be greatly varied and modified; but

What I claim as new, and desire to secure by Letters Patent is—

Rotating or otherwise moving as described the flesh of animals while in contact with salt or other substances with which it is desired to impregnate it, thereby accelerating or aiding their incorporation or mixing more readily than can be done by hand.

THOS. DAVISON.

Witnesses:
FREDERIC DUNBAR,
JAMES D. CRAMSEY.